(12) United States Patent
Sobiski et al.

(10) Patent No.: US 6,661,937 B2
(45) Date of Patent: Dec. 9, 2003

(54) FIBER SQUEEZING DEVICE

(75) Inventors: Donald J. Sobiski, Horseheads, NY (US); Eric T. Green, Corning, NY (US)

(73) Assignee: Corning, Incorporated, Corning, NY (US)

( * ) Notice: Subject to any disclaimer, the term of this patent is extended or adjusted under 35 U.S.C. 154(b) by 235 days.

(21) Appl. No.: 09/945,163

(22) Filed: Aug. 31, 2001

(65) Prior Publication Data

US 2002/0064329 A1 May 30, 2002

Related U.S. Application Data

(63) Continuation-in-part of application No. 09/589,423, filed on Jun. 7, 2000, now Pat. No. 6,556,732.
(60) Provisional application No. 60/292,409, filed on May 21, 2001.

(51) Int. Cl.$^7$ .............................. G02B 6/00; G02B 5/30
(52) U.S. Cl. .......................... 385/11; 385/27; 359/483; 359/500
(58) Field of Search ............................ 385/11, 15, 27, 385/31, 39, 50, 52, 65; 359/500, 501, 483

(56) References Cited

U.S. PATENT DOCUMENTS

| 5,561,726 | A |   | 10/1996 | Yao ............................ 385/11 |
| 5,654,818 | A |   | 8/1997 | Yao ............................ 359/246 |
| 5,796,510 | A |   | 8/1998 | Yao ............................ 359/256 |
| 5,903,684 | A | * | 5/1999 | Payton ........................ 385/11 |
| 5,978,125 | A |   | 11/1999 | Yao ............................ 359/256 |

OTHER PUBLICATIONS

U.S. patent application Ser. No. 09/589,423, filed Jun. 7, 2000.
U.S. patent application Ser. No. 10/151,448, filed May 20, 2002.

Fred Heismann; "Analysis Of a Reset–Free Polarization Controller for Fast Automatic Polarization Stabilization in Fiber–Optic Transmission Systems"; Journa of Lightwave Technology, vol. 12, No. 4, Apr. 1994.
Scott H. Rumbaugh, Michael D. Jones, and Lee W. Casperson; "Polarization Control for Coherent Fiber–Optic Systems Using Nematic Liquid Crystals"; Journal of Lightwave Technology, vol. 8, No. 3, Mar. 1990.
Nigel G. Walker and Graham R. Walker; "Polarization Control for Coherent Communications"; Journal Of Lightwave Technology, vol. 8, No. 3, Mar. 1990.
Haruhito Shimizu, Shuntaro Yamazaki, Takashi Ono, and Katsumi Emura; "Highly Practical Fiber Squeezer Polarization Controller"; Journal Of Lightwave Technology, vol. 9, No. 10, Oct. 1991.
R. Noe; "Endless Polarisation Control Experiment With Three Elements of Limited Birefringence Range"; Electronics Letter, vol. 22, No. 25 Dec. 4, 1986.
N.G. Walker and G.R. Walker; "Endless Polarisation Control Using Four Fibre Squeezers"; Electronics Letter, vol. 23, No. 6, Mar. 12, 1987.

* cited by examiner

Primary Examiner—Rodney Bovernick
Assistant Examiner—Juliana K. Kang
(74) Attorney, Agent, or Firm—Volentine Francos, PLLC

(57) ABSTRACT

According to an exemplary embodiment of the present invention, an apparatus for selectively introducing birefringence in an optical fiber includes an actuator which selectively exerts a force on the fiber, and a registration key which selectively orients an axis of the optical fiber at predetermined azimuths.

According to another illustrative embodiment of the present invention, an apparatus for changing the polarization state of an optical signal includes a plurality of sequentially connected phase shifters, wherein each of the phase shifters is adapted to exert a force on an optical fiber disposed therein. Each of the plurality of phase shifters includes a registration key which selectively orients an axis of the optical fiber disposed in the registration key at a predetermined azimuth.

9 Claims, 5 Drawing Sheets

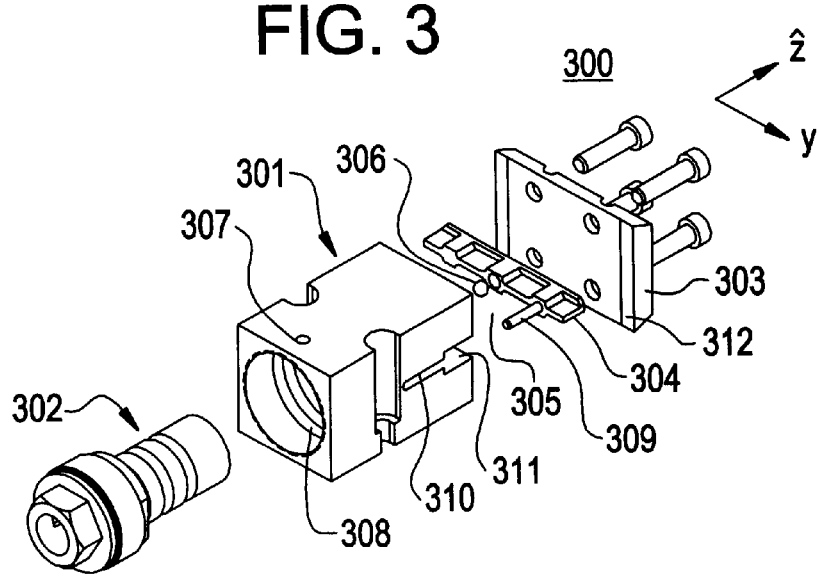
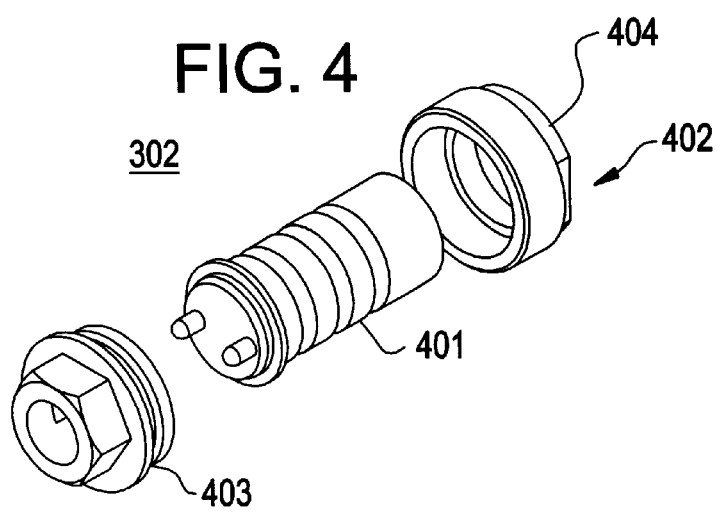

FIBER SQUEEZING DEVICE

CROSS REFERENCE TO RELATED APPLICATIONS

The present application is a continuation-in-part of U.S. patent application Ser. No. 09/589,423, now U.S. Pat. No. 6,556,732, entitled "All Fiber Polarization Mode Dispersion Compensator" to Sobiski, et al., filed Jun. 7, 2000. The present invention is related to and claims priority from U.S. Provisional Patent Application Serial 60/292,409, entitled "A Fiber Squeezing Device", filed May 21, 2001. The disclosures of the above-captioned parent and provisional applications are specifically incorporated by reference herein and for all purposes.

FIELD OF THE INVENTION

The present invention relates generally to optical fiber communications, and particularly to an apparatus for the inducing birefringence to an optical fiber in a controlled manner.

BACKGROUND OF THE INVENTION

Optical transmission systems, including optical fiber communication systems, have become a useful vehicle for carrying voice and data at high speeds. However, in an optical transmission system, waveform degradation due to polarization mode dispersion (PMD) in the optical transmission medium can be problematic, particularly as transmission speeds are ever-increasing.

For purposes of illustration, a single-mode optical fiber having an optical wave of arbitrary polarization may be represented as a linear superposition of two orthogonally polarized optical modes (e.g. orthogonally polarized $HE_{11}$ modes). In an ideal optical fiber waveguide, the two optical modes are degenerate in terms of their propagation properties owing to the cylindrical symmetry of the waveguide. This degeneracy, which is the source of the term single mode, is realized to a greater or lesser degree in deployed fibers, depending on the manufacturing process of the fiber and the extent to which external mechanical forces act on the fiber in a deployed system.

Real optical fibers, therefore, contain some degree of anisotropy due to the unintentional loss of circular symmetry. Whether this asymmetry occurs during manufacturing or is due to external forces, the loss of circular symmetry gives rise to two distinct polarization modes, with distinct phase and group velocities. As such, polarization effects in single-mode fibers are a direct consequence of the unintentional loss of degeneracy for the polarization modes.

Accordingly, when subject to stress either due to fabrication, or external factors, a single-mode optical fiber now exhibits a loss of degeneracy of the two optical modes. This may be quantified as a difference in the local propagation constants for the modes:

$$\beta_s - \beta_f = \frac{\omega n_s}{c} - \frac{\omega n_f}{c} = \frac{\omega \Delta n_{\mathit{eff}}}{c} \quad (1)$$

where $\beta_s$ is the propagation constant of the mode along the slow axis; $\delta_f$ is the propagation constant of the mode along the fast axis; $\omega$ is the angular frequency of the light, c is the speed of light in vacuum; $n_s$ and $n_f$ are the effective indices of refraction for the slow and fast modes, respectively; and $\Delta n_{\mathit{eff}}$ is the differential index of refraction, which is also referred to as the birefringence.

While the differential index of refraction, $\Delta n_{\mathit{eff}}$ is typically approximately two to four orders of magnitude smaller than the respective indices of refraction for the fast and slow axes, as transmission speeds and distances are ever increasing, the affect of polarization mode dispersion may be become particularly problematic. To this end, the differential phase velocity which results from the difference in the local propagation constants given by equation (1), often results in a difference in the local group velocities for the two polarization modes. This differential group velocity may be particularly problematic in digital optical communication systems, where the optical signal is ideally a square wave.

In the time domain, the differential group velocity is manifest as a propagation time difference known as the differential group delay (DGD). The differential group delay may result in bit-spreading of the optical signals. Accordingly, the affect of this type of dispersion is a spreading of the original pulse in time, resulting in an overflow into a time slot of the transmitted signal which has been allotted to another bit. When the overflow becomes excessive, inter-symbol interference (ISI) may occur. ISI may result in an increase in the bit-error rate to unacceptable levels.

A variety of techniques for compensating for polarization mode dispersion are known. Generally, these techniques involve changing the birefringence of the fiber. It is known that a change in birefringence, as a function of applied stress, is typically greatest when the stress is applied transversely to either the fast axis or the slow axis of the optical fiber. Additionally, piezoelectric actuators are useful as fiber-squeezing devices as they are generally faster, use less power, and introduce less noise than electromagnetic based fiber squeezers. Finally, to dynamically compensate for polarization mode dispersion in a deployed system, it is often necessary to have a number of stress actuators (fiber squeezers) oriented at a predetermined angle relative to one another.

While the above-captioned conventional fiber-actuators for introducing compensating birefringence to an optical fiber in a deployed system have showed some promise, there are clearly drawbacks and shortcomings thereto. For example, many conventional actuators introduce axial strain. This strain (pulling) on the fiber may result in breakage and coating delamination of the fiber. Accordingly, this is not a robust technique. Moreover, conventional stress-actuators, which introduce stress either longitudinally or axially have proven difficult to align initially, and to maintain in alignment in a deployed system.

What is needed, therefore, is a stress actuator for compensating polarization mode dispersion which overcomes the drawbacks and shortcomings of the conventional devices described above.

SUMMARY OF THE INVENTION

According to an exemplary embodiment of the present invention, an apparatus for selectively introducing birefringence in an optical fiber includes an actuator which selectively exerts a force on the fiber, and a registration key which selectively orients an axis of the optical fiber at predetermined azimuths.

According to another illustrative embodiment of the present invention, an apparatus for changing the polarization state of an optical signal includes a plurality of sequentially connected phase shifters, wherein each of the phase shifters is adapted to exert a force on an optical fiber disposed therein. Each of the plurality of phase shifters includes a registration key which selectively orients an axis of the optical fiber disposed in the registration key at a predetermined azimuth.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 2 shows a right-handed coordinate system useful in describing the various aspects of polarization in accordance with an exemplary embodiment of the present invention.

FIG. 3 is an exploded view of a fiber squeezing apparatus in accordance with an exemplary embodiment of the present invention.

FIG. 4 is an exploded view of a piezoelectric actuator assembly in accordance with an exemplary embodiment of the present invention.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the present invention relates to a phase shifter which selectively introduces birefringence in an optical fiber. The phase shifter includes an actuator that exerts a force on an optical fiber in a transverse manner. The actuator may be disposed in a mounting structure in which the optical fiber is disposed. The optical fiber is illustratively a polarization maintaining fiber (PMF) having stress-rods, or other stress inducing mechanism, such as an elliptical core, resulting in a stress axis, which will be orthogonal to the slow-axis of the PMF.

A registration key in accordance with an exemplary embodiment of the present invention enables registration (alignment) of the slow-axis of the PMF relative to the actuator for effective application of stress. The phase shifter in accordance with an illustrative embodiment of the present invention may be cascaded with a plurality of similar phase shifters enabling any arbitrary input polarization state to any arbitrary output polarization state. By virtue of the registration key, the alignment of the slow-axis may be effected without substantial stress or torsion on the optical fiber.

Finally, it is noted that the introduction of birefringence in accordance with an exemplary embodiment of the present invention may be dynamic. To wit, the birefringence may be modulated so arbitrary shifts in the polarization state of an optical signal can be achieved.

Figure 1:
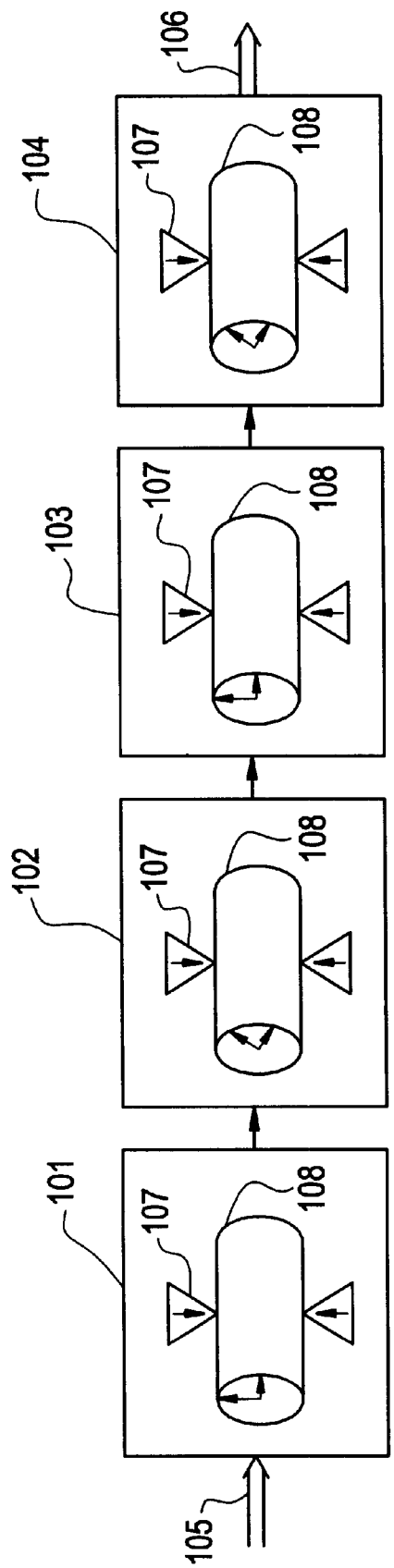
FIG. 1 is a block diagram of a phase shifting (PS) device illustratively including four individual phase shifters in accordance with an exemplary embodiment of the present invention.

FIG. 1 shows a block diagram of a phase shifting device, which includes plurality of phase shifters, illustratively four phase shifters (101, 102, 103 and 104) in a cascaded arrangement. Each phase shifter includes an actuator 107, which is illustratively a piezoelectric actuator. Moreover, each phase shifter includes a length of polarization maintaining fiber (PMF) which has a stress axis oriented perpendicularly to the slow axis of the fiber. The illustrative actuators 107 are piezoelectric actuators which have a response time typically much less than one millisecond. The optical fiber sections 108 are normally coated with a material (e.g. a metal or polymer) so the fiber can withstand the mechanical stress applied by the actuator 107 repetitively over a long period of time.

In the illustrative embodiment shown in FIG. 1, the fast-axes of fiber sections 108 are oriented at 45°

$$\left(\frac{\pi}{4}\right)$$

azimuths relative to one another, in an alternating 0°/45° fashion. (As used herein, the term azimuth is defined as the angle that a fast-axis of a PMF makes with the y-axis shown in FIG. 2, after a mechanical rotation about the z-axis). As such, phase shifters 101, 102, 103 and 104 are oriented at 45° relative to one another, in an alternating fashion. Illustratively, the fiber section 108 of phase shifter 101 is at 0° azimuth, the fiber section 108 of the phase shifter 102 is at 45° azimuth, the fiber section 108 of the third phase shifter 103 is at 0° azimuth, and the fast-axis of fiber section 108 of the fourth phase shifter 104 is at 45° azimuth. It is noted that the above described exemplary embodiment in which the fast axes of the PMF's of the respective phase shifters are oriented at alternating 0°/45° azimuths is merely illustrative of the present invention.

The use of a plurality of phase shifters having azimuths oriented in a particular manner enables a controlled transformation of the state of polarization of an optical signal. In an embodiment described in detail in the parent application, three phase shifters are used. The phase shifters described in the parent application have alternating 0°/45° azimuths. Applicants have discovered that the use of four phase shifters oriented at alternating 0°/45° azimuths as described above enables the polarization transformation of any arbitrary input polarization state to any arbitray output polarization state in deployed systems. To this end, while in theory fewer than phase shifters having alternating 0°/45° azimuths will allow any point on a Poincare' sphere to be reached, in practice, misalignment between phase shifters can result in only a subset of polarization states on a Poincare' sphere being reached. Accordingly, applicants have found that the use of four phase shifters (e.g., phase shifters 101, 102, 103 and 104) having respective fast-axes oriented in the alternating fashion described enables the mapping of any arbitrary input polarization state (e.g., 105) to any arbitrary output polarization state (e.g., 106) where the alignment of the respective fast axes may be less than perfect. This is particularly useful to effect polarization mode dispersion compensation or polarization scrambling in a deployed system.

Figure 5A:
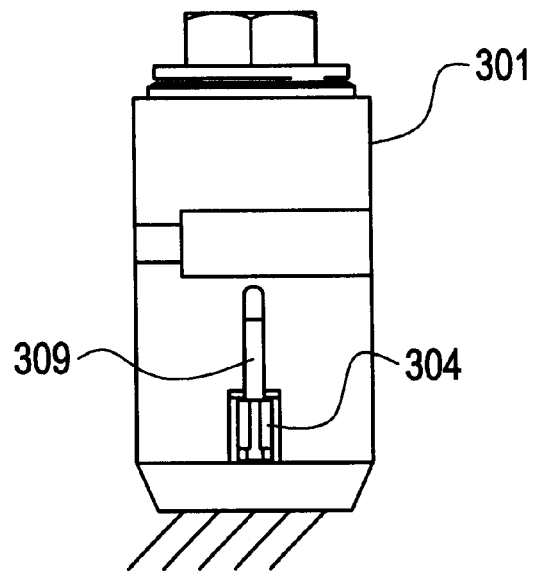
FIGS. 5(a) and 5(b) are cross-sectional views of a fiber squeezing apparatus showing the kinematic relationship of fiber squeezing elements, in accordance with an exemplary embodiment of the present invention.

Turning to FIG. 3, an illustrative phase shifter 300 in accordance with an exemplary embodiment of the present invention is shown in exploded view. (It is noted that the stress-inducing action of the various elements of FIG. 3 is shown in FIGS. 5(*a*) and 5(*b*)). The phase shifter 300 includes a main body 301, a piezoelectric actuator 302, a static endplate 303 and a dynamic presser plate 304 which is coupled to the piezoelectric actuator 302 by a kinematic ball and socket joint 305. The ball and socket joint 305 are formed by a cylindrical depression in the dynamic presser plate, a conical depression in the endface of the piezoelectric actuator (not shown in FIG. 3), and a precision ball 306.

The main body 301 includes mounting points for assembly of the apparatus to an appropriate mounting substrate (not shown). The main body 301 also includes a fine-pitch internal thread which enables precision adjustment of the piezoelectric actuator in a deployed system. The adjustment may be necessary to define a particular preload on the optical fiber. The preload is useful to position the piezoelectric actuator 302 in contact with the fiber in a partially stressed condition. Because the piezoelectric actuator 302 has a limited range of motion (illustratively in the range of approximately 10 μm to approximately 20 μm), any lash present will affect the stress induced bireffingence. The preload, or prestress, insures that the piezoelectric actuator 302 will be optimally effective.

An access hole 307 may be located near a top surface of the main body 301, and extends through to the internal thread 308 to enable a post-assembly thread-locking element (not shown) to be applied once a particular preload has been achieved. The main body 301 may also include a transverse slot 311 which receives the dynamic presser plate 304 and an alignment slot 310 perpendicular to the transverse slot 311. The alignment slot may receive an alignment pin 309 defined in the dynamic presser plate 304. Finally, the main body may include an array of threaded holes to received mounting screws which serve to secure the static end plate.

Figure 5B:
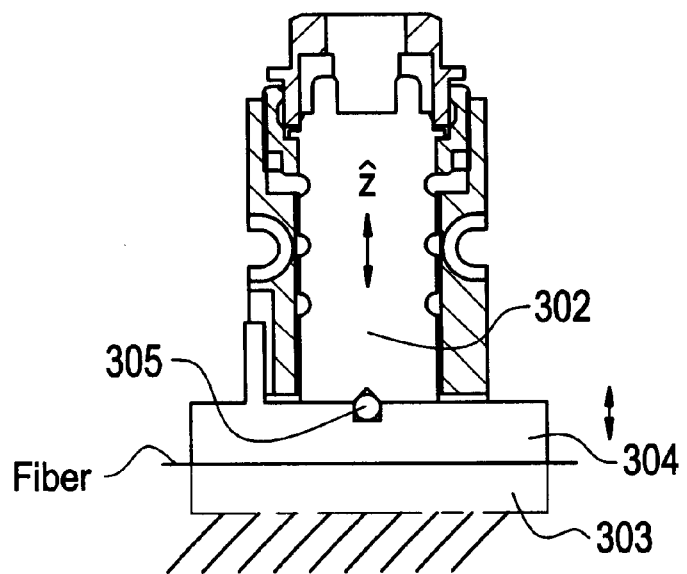

It is noted that the static endplate 303 includes a flat surface of sufficient length to apply force to the transversely installed optical fiber (see FIG. 5B). An equivalent amount of birefringence can be achieved by applying force to a shorter length of fiber, but the magnitude of fiber deformation is greater and therefore may diminish the reliability of the fiber over time. The same force, applied over a greater length of fiber, effects the same degree of birefringence, with less diminution of the optical fiber reliability. The length selected for the phase shifter 300 is great enough to permit reliable operation, and small enough to result in a suitably compact assembly. A tangentially curved surface 312 is defined at either end of a flat surface of the main body 301 to eliminate a discontinuous application of stress on the fiber, further increasing the reliability of the fiber over time. The curved surface 312 may also permit the fiber to exit the phase shifter 300 with a slight misalignment, however without creating a stress riser or an acceptably small bend radius which could result in fiber damage, or optical loss, respectively.

The dynamic presser plate 304 includes flat and curved surfaces (not shown) which correspond to those of the static endplate 303 which serve the same purpose. The dynamic presser plate 304. may also include a cylindrical recess which accepts a ball and a cylindrical alignment feature 309 which engages alignment slot 310 in the main body 301. The combination of these elements enables a kinematic relationship which is appropriate to the operation of the device. The cylindrical alignment feature 309 and alignment slot 310 restrict angular misalignment of the dynamic presser bar 304 with respect to the substantially parallel surface of the static endplate 303 to within approximately 0.1°. The ball joint 305 permits the dynamic pressure plate 304 to tolerate substantially any angular misalignment of the actuator access with respect to the static endplate 303; and further permits the dynamic presser plate 304 to become substantially self-aligned to the static endplate 303 such that the two fiber contacting surfaces remain substantially parallel. This results in substantially uniform stress being applied along the length of the fiber. Finally, the alignment slot 310 in the main body 301 permits the dynamic presser plate 304 to translate laterally (±y-direction as shown in FIG. 3) along the length of the fiber as the preload is being applied; and to tolerate any eccentricity of the conical recess in the endface of the piezoelectric actuator 302 with respect to the actuator access.

The position of the dynamic presser bar 304 is substantially defined at all times by the location of the precision ball 306 in position of the cylindrical alignment feature with the main body alignment slot.

Turning to FIG. 4, an exploded view of the piezoelectric actuator 302 is shown. The piezoelectric actuator 302 is comprised of a piezoelectric element 401, an externally threaded collar 402, and an adapter 403, which is illustratively hexagonal. When the adapter is affixed to the threaded collar it captures the piezoelectric actuator and provides an adjustment point for the subassembly. Two parallel flat surfaces 404 may be defined on the threaded collar to facilitate the assembly of the collar to the hexagonal adapter. A conical recess defined in the endface of the piezoelectric actuator accepts the kinematic ball joint shared with the dynamic presser bar 304.

As described previously, the alternating 45° azimuth relative alignment of the fast-axes of optical fibers in a cascaded structure such as shown in FIG. 1 is particularly advantageous to achieving the desired result of transforming any arbitrary input polarization state to any arbitrary output polarization state in a polarization mode dispersion compensator or polarization scrambler or like device. One particularly useful aspect of the present invention are exemplary registration keys described in conjunction with FIGS. 6–9.

Figure 6:
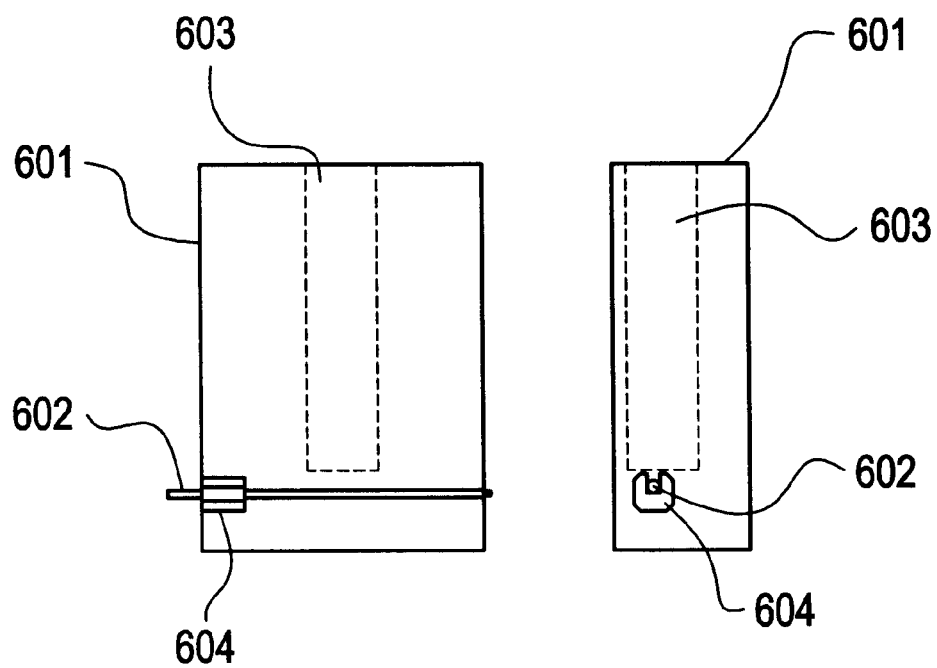
FIG. 6 shows two elevations in cross-section of a main body of a phase shifter in accordance with an exemplary embodiment of the present invention.

Turning initially to FIG. 6, a main body 601 which is similar to main body 301 shown in FIG. 3, and in FIGS. 5(*a*) and 5(*b*), is shown in front and side cross-sectional views. The main body 601 includes an opening for receiving an optical fiber 602. The optical fiber 602 is acted upon by a piezoelectric actuator (not shown) which may be disposed in the piezoelectric actuator chamber 603. As can be appreciated, the motion of the piezoelectric actuator will result in the application of a transverse force to the application fiber. The optical fiber 602 is disposed in a registration key 604.

The registration key 604 enables the optical fiber to be transversely stressed at 45° azimuthal intervals by manipulation of the key, and not of the optical fiber. To wit, turning to FIG. 7, a cross-sectional view of the optical fiber 701 disposed in an illustrative registration key 702 is shown. The registration key 702 includes a slot 703 for reception of the fiber 701. The registration key 702 is illustratively octagonal in shape, and thereby exhibits symmetry every 45°. This 45° symmetry plays a useful role in the proper alignment of the slow-axis of the optical fiber 702 with the direction of stress provided by the piezoelectric actuator of the actuator according to an illustrative embodiment of the present invention.

Specifically, the symmetry provided by the illustrative octagonal shaped registration key 702 enables different sections of polarization maintaining fiber (e.g., sections 108 in phase shifters 102–104 of FIG. 1) to be aligned to one another at alternating of 0°/45° angles. The registration key 702 provides this alignment automatically and in a robust and repeatable manner substantially without inducing torsional or axial stress in the alignment of the fiber. The orientation is effected by rotation of the registration key 702. By virtue of the illustrative registration key 702, the applied stress may be effected accurately at desired orientations (e.g., desired angular orientations relative to the slow-axis of the optical fiber).

Figure 7:
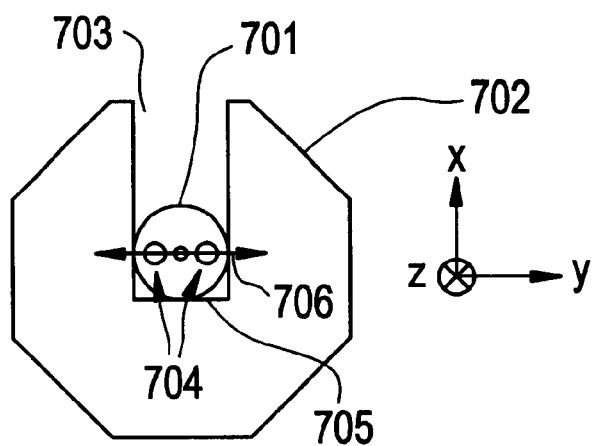
FIG. 7 is a cross-sectional view of a registration key holding a polarization maintaining fiber (PMF) in accordance with an exemplary embodiment of the present invention.

In accordance with the illustrative embodiment shown in FIG. 7, the slow axis of the polarization maintaining fiber 701 is aligned along the stress axis 706 (i.e., the y-axis and the right-handed coordinate system shown in FIG. 7). In the exemplary embodiment of FIG. 7, stress rods 704 are inserted in the blank as part of the manufacturing process before the fiber is drawn. These rods have a different coefficient of thermal expansion compared to the glass material within which they are embedded, and foster and environmental stress as a consequence. The stress causes the index of refraction to become greater in the direction that is aligned with the rod centers, resulting in the slow-axis of the device. This axis is aligned with the registration key prior to splicing, and the fiber is bonded in place with an epoxy. In the exemplary embodiment presently described, the slow axis is parallel to the base 705 of the slot 703, which is disposed in the y–z plane. The orientation of the slow-axis is readily evident because of its fixed alignment within the slot 703. Moreover, the slot 703 enables visual indication of the orientation of the orthogonal axes (i.e. fast and slow axes) of fiber 701 by aligning the stress rods 704 (and therefore the stress axis 706). Finally, it is noted that a similar orientation of the stress axis would be carried out if other types of PMF (e.g. elliptical core fiber) are used in accordance with the present invention.

After the optical fiber is aligned in slot 703 and bonded therein, the registration key 702 is rotated to a desired orientation. Illustratively, the registration key of phase shifter 101 shown in FIG. 1 would be oriented so that the slow and fast axes of the PMF would be at a 45° angle relative to the fast and slow axes of the PMF disposed in the registration key of phase shifter 102. Of course, the ends of the PM fibers of these phase shifters could be coupled and bonded. Thus, the registration key enables the desired orientation of the polarization axes of the PM fibers of each phase shifter without significant torsional or axial stress being applied to the fiber.

As can be readily appreciated, if the piezoelectric actuator exerts a force in the negative y-direction upon the registration key shown in FIG. 7, the induced stress would be along the fast-axis of the optical fiber. Contrastingly, by rotating the registration key QQT by 45°

$$\left(\frac{\pi}{4}\text{radians}\right)$$

in either the positive or negative direction, the piezoelectric actuator applying a force in the -y-direction would result in a force vector having components of equal magnitude in the direction of the slow and fast axis of optical fiber 701. As is known, an application of force in this orientation will result in the advancement and retardation, respectively of the orthogonal polarization states oriented along the fast and slow axes, respectively. Ultimately, this effects a phase delay of $$\frac{\pi}{2}$$

between the orthogonal states.

It is noted that the above registration key is merely illustrative of the present invention, and other techniques may be used to effect the desired orientation of the phase shifters (e.g., phase shifters 101–104 of FIG. 1). To this end, the registration key in accordance with the illustrative embodiment shown in FIGS. 6 and 7 exhibits the symmetry at 45° to enable the application of stress at sequential phase shifter at alternating 0°/45° azimuthal intervals by disposing the optical fiber in a hexagonal registration key. The particularly useful aspect of the registration is the 45° symmetry it provides. Of course, this may be achieved through the use of other structures, as well as by other orientations of the polarization maintaining optical fiber within the registration key. As to the former, other registration keys and fiber elements may be used to create the alternating 0°/45° azimuth orientation of the phase shifters, as is described in further detail below.

In accordance with the above-described exemplary embodiment of the present invention, an actuator assembly enables reliable alignment of the slow-axis of polarization maintaining fiber with the direction of stress of the piezoelectric actuator. It is noted that an equivalent affect may be obtained by rotating the fiber 90° and aligning the direction of stress with the fast axis of the fiber. The registration key 702 in accordance with an exemplary embodiment of the present invention provides for straightforward assembly and alignment of the optical fiber relative to the piezoelectric actuator. This alignment is useful in inducing the desired change in birefringence of the fiber by controlled application of transverse stress. In accordance with a particular aspect of the present invention, a low power, high speed and substantially noise free piezoelectric actuator is used. Moreover, the registration key enables visual confirmation of correct assembly for the desired application of stress. Finally, the 45° symmetry provided by the registration key 702 enables the alignment of cascaded sections of fiber with minimal twisting of the fiber in between the actuators. This has the particular benefit of enabling phase shifters (e.g. phase shifters 101–104 shown in FIG. 1) to be disposed in the same plane, so they can be secured to flat plate in a straightforward manner. Moreover, the polarization shifters could be stacked vertically without affecting performance. Ultimately, this enables an accurate polarization transformation in a deployed optical system.

Figure 8:
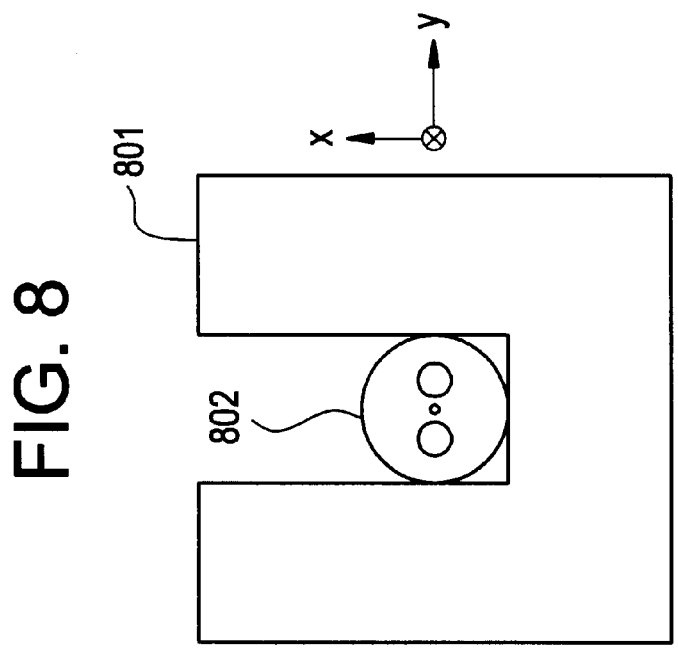
FIG. 8 is a cross-sectional view of a registration key holding a polarization maintaining fiber (PMF) in accordance with an exemplary embodiment of the present invention.

Referring now to FIG. 8, a cross-sectional view of a registration key according to an exemplary embodiment of the present invention is shown. Registration key 801 includes a polarization maintaining fiber 802 which has its slow axis oriented in the y-direction according to the rectangular coordinate system shown in FIG. 8. The registration key 801 is substantially rectangular in shape, and may be used in conjunction with a phase shifter such as the phase shifter described in the exemplary embodiment above. Accordingly, there are similarities between the registration key 801 and the registration key described in connection with the exemplary embodiment above. In the interest of brevity, the similarities therebetween will be omitted, and the distinctions will be emphasized.

Figure 9:
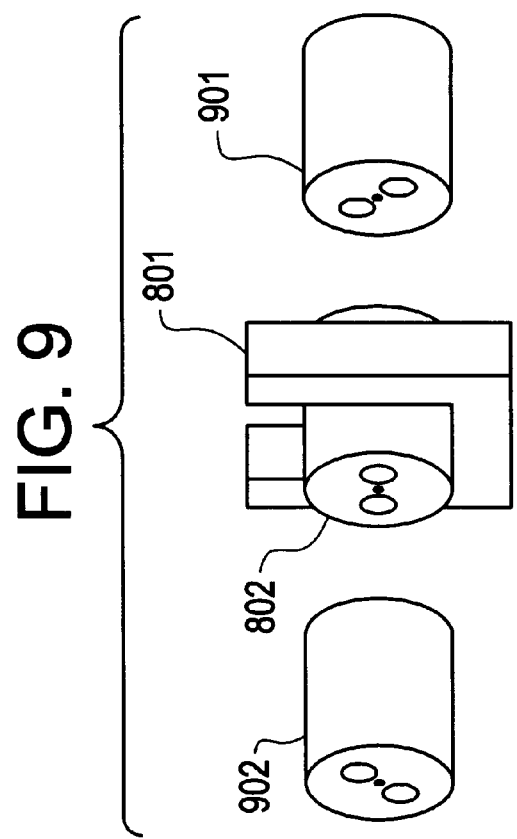
FIG. 9 is an exploded view of a registration key having a PMF therein, and input and output PMF fibers oriented at 45° to the PMF disposed in the registration key in accordance with an exemplary embodiment of the present invention.

The registration key 801 may be disposed between a first polarization maintaining fiber 901 and a second polarization maintaining fiber 902 shown in FIG. 9. The fast axis of the first PMF 901 is oriented at a −45° azimuth, while the fast axis of the second PMF 902 is oriented at a +45° azimuth. The registration key 801 having polarization maintaining fiber 802 may be disposed in a phase shifter (not shown) similar to that described previously. Second polarization maintaining fiber 902 would be spliced at a first end to polarization maintaining fiber 802, and at a second end to another polarization maintaining fiber disposed in a registration key (not shown) such as registration key 801. This registration key would be disposed in another phase shifter. Likewise, first polarization maintaining fiber 901 is spliced at a first end to polarization maintaining fiber 802. First polarization maintaining fiber 901 would then be spliced at a second end to a polarization maintaining fiber disposed in a registration key (not shown) similar to registration key 801.

This cascading could continue to include a fourth phase shifter. The phase shifters in accordance with the exemplary embodiment of the present invention would be substantially coplanar. Ultimately, this cascaded arrangement would enable four phase shifters having the desired alternating 0°/45° orientations. Thus, exemplary registration key shown in FIG. 8 when incorporated into a cascaded phase shifters as described enables the transformation of any arbitrary input polarization into any arbitrary output polarization in a manner which overcomes the alignment problems described above. Of course, the four-phase shifter structure is illustrative, and it is within the purview of the present invention to use fewer (or more) phase shifters.

It is noted that in accordance with another exemplary embodiment, the splicing of first PMF 901 and second PMF 902 can be foregone. In this embodiment, polarization maintaining fiber 802 would be oriented in registration key 801 as shown in FIG. 8. As such, to achieve the 45° relative orientation of cascaded phase shifters (e.g. four cascaded phase shifters as described above) the phase shifters would have alternating orientations of ±22.5°. This embodiment is particularly advantageous because it fosters a more compact arrangement of the components of a phase shifting device.

The invention having been described in detail, it will be readily apparent to one having ordinary skill in the art that the invention may be varied in a variety of ways. Such variations are not to be regarded as a departure from the scope of the invention. All such modifications as would be obvious to one of ordinary skill in the art, having had the benefit of the present disclosure, are intended to be included within the scope of the appended claims and the legal equivalents thereof.

We claim:

1. A fiber-squeezing apparatus for modifying a birefringence in an optical fiber utilized in an optical communications component, the optical fiber having a longitudinal axis and a characteristic transverse axis associated with the birefringence of the optical fiber, the fiber-squeezing apparatus comprising:

an actuator which selectively exerts a variable force on the optical fiber in a direction generally perpendicular to the longitudinal axis of the optical fiber, and at a designated angular orientation relative to the characteristic transverse axis associated with the birefringence of the optical fiber; and a registration key engaging the optical fiber and the actuator to maintain the angular orientation between the optical fiber and the actuator, the registration key providing a plurality of available predetermined angular orientations from which the designated angular orientation is selected.

2. The fiber-squeezing apparatus of claim 1 wherein the plurality of available predetermined angular orientations are disposed at 0° and integer multiples of 45° relative to the characteristic transverse axis of the optical fiber.

3. The fiber-squeezing apparatus of claim 1 wherein the registration key has a polygon shape with a plurality of sides, two or more of the plurality of sides corresponding to and having a fixed angular relationship with the plurality of available predetermined angular orientations from which the designated angular orientation between the characteristic transverse axis of the optical fiber and the actuator is selected.

4. The fiber-squeezing apparatus of claim 1 wherein the polygon shape of the registration key is a generally regular octagon, and wherein each of the plurality of available predetermined angular orientations from which the designated angular orientation is selected are disposed at 45° ($\pi/4$) angles relative to an adjacent one of the plurality of available predetermined angular orientations.

5. The fiber-squeezing apparatus of claim 1 wherein the registration key defines a peripheral edge which circumscribes the optical fiber and a recess into which the optical fiber is at least partially received, and further wherein the recess is selected from a group consisting of a slot extending partially through the registration key and communicating with the peripheral edge of the registration key, or a bore extending entirely through the registration key without intersecting the peripheral edge.

6. The fiber-squeezing apparatus of claim 1 wherein the optical fiber is a polarization-maintaining fiber in which the birefringence in produced by a physical structure within the fiber selected from a group consisting of an elliptical core, an elliptical cladding, or a pair of longitudinal stress-rods, and wherein the characteristic transverse axis associated with the birefringence is selected from a group consisting of a fast propagation axis, a slow propagation axis, a major physical axis, or a minor physical axis.

7. A method for aligning an optical fiber with an actuator, the optical fiber having a birefringence, a characteristic transverse axis associated with the birefringence, and a longitudinal axis, the actuator having a force-applying element which selectively applies a variable pressure on the fiber generally perpendicular to the longitudinal axis, the method comprising the steps of:

providing a registration key defining a plurality of available predetermined orientations;

engaging the registration key and the optical fiber such that there is a fixed relationship between the orientation of the registration key and the characteristic transverse axis of the optical fiber;

engaging the registration key with the actuator such that a selected one of the plurality of available predetermined angular orientations exists and is maintained between the characteristic transverse axis of the optical fiber and the force-applying element of the actuator; and securing the optical fiber relative to the actuator.

8. The method of claim 7 wherein the registration key has a polygon shape with a plurality of sides, two or more of the plurality of sides corresponding to and having a fixed angular relationship with the plurality of available predetermined angular orientations from which the designated angular orientation between the characteristic transverse axis of the optical fiber and the actuator is selected.

9. The method of claim 8 wherein the polygon shape of the registration key is a generally regular octagon, and wherein each of the plurality of available predetermined angular orientations from which the designated angular orientation is selected are disposed at 45° ($\pi/4$) angles relative to an adjacent one of the plurality of available predetermined angular orientations.

* * * * *